United States Patent [19]
Gamble et al.

[11] Patent Number: 6,163,770
[45] Date of Patent: Dec. 19, 2000

[54] COMPUTER APPARATUS AND METHOD FOR GENERATING DOCUMENTATION USING A COMPUTED VALUE FOR A CLAIMS COST AFFECTED BY AT LEAST ONE CONCURRENT, DIFFERENT INSURANCE POLICY FOR THE SAME INSURED

[75] Inventors: Michael R. Gamble, Woodridge, Ill.; Jerry D. Wilson, Kirkland, Wash.

[73] Assignee: Financial Growth Resources, Inc., Woodridge, Ill.

[21] Appl. No.: 09/139,863

[22] Filed: Aug. 25, 1998

[51] Int. Cl.[7] .................................................... G06F 17/60
[52] U.S. Cl. .................................................................. 705/4
[58] Field of Search ................................... 705/4; 283/54

[56] References Cited

U.S. PATENT DOCUMENTS

| | | | |
|---|---|---|---|
| 4,831,526 | 5/1989 | Luchs et al. | 705/4 |
| 5,446,653 | 8/1995 | Miller et al. | 705/4 |
| 5,752,236 | 5/1998 | Sexton et al. | 705/4 |
| 5,845,256 | 12/1998 | Pescitelli et al. | 705/4 |
| 5,873,066 | 2/1999 | Underwood et al. | 705/4 |
| 5,884,274 | 3/1999 | Walker et al. | 705/4 |
| 5,966,693 | 10/1999 | Burgess | 705/4 |
| 6,014,632 | 1/2000 | Gamble et al. | 705/4 |

FOREIGN PATENT DOCUMENTS

| | | |
|---|---|---|
| 6-168256 | 6/1994 | Japan . |

OTHER PUBLICATIONS

Clark, L.H., "Perils of Insuring Bank Deposits," The Wall Street Journal, Eastern edition, p. 1, May 8, 1989.

Reynolds, A., "The Worst Lying about the Economy in the Past 50 Years," The Wall Street Journal, Easter edition, p. A16, Oct. 21, 1992.

McGinley, L., "Bipartisan Health–Care REform Bill Assailed by Individual–Policy Carriers," The Wall Street Journal, Eastern edition, p. A2, Feb. 8, 1992.

"Letters to the Editor: Health Insurance and 'Moral Hazards,'" Sabshin, Bursztajn, and Weitzel, The Wall Street Journal, Eastern edition, p. A17, Jun. 12, 1996.

Frum, D., "A Tax Code Full of Favors," The Wall Street Journal, Eastern edition, p. A20, Nov. 19, 1997.

Melloan, G., "Would Credit Markets Work Better Without Bailouts?" The Wall Street Journal, Eastern edition, p. A23, Dec. 9, 1997.

(List continued on next page.)

*Primary Examiner*—James P. Trammell
*Assistant Examiner*—Nicholas David Rosen
*Attorney, Agent, or Firm*—Peter K. Trzyna

[57] ABSTRACT

A method for using a digital electrical apparatus to electrically process signals in generating output for insurance documentation for a first insurance policy for a first risk having a claims cost reflecting: a concurrent second insurance policy for a second risk, the second risk being different from the first, the policies being for the same insured person, and the second policy affecting a claims cost of the first policy; the method including the steps of: in a digital electrical computer apparatus comprising a digital computer having a processor, the processor electrically connected to a memory device for storing and retrieving operations including machine-readable signals in the memory device, to an input device for receiving input data and converting the input data into input electrical data, to a visual display unit for converting output electrical data into output having a visual presentation, to a printer for converting the output electrical data into printed documentation, wherein the processor is programmed to control the apparatus to receive the input data and to produce the output data by steps including: inputting actuarial assumptions defining the first insurance policy; and computing a value of a specific financial attribute of the first insurance policy; the method further including the step of inserting the value of the financial attribute in the first insurance policy and other printed documentation related to the first insurance policy.

17 Claims, 5 Drawing Sheets

OTHER PUBLICATIONS

Fries, Brant E.; and Durance, Paul W., "A comprehensive payment model for short– and long–stay psychiatric patients," Health Care Financing Review, Winter 1993, vol. 15, No. 2, p. 31 et subseq.

Kelly, Deborah, "Wellness Pays off for Businesses Stay–Well Plans Help Corporations with Bottom Line," the Richmond Times–Dispatch, p. E–1, Nov. 21, 1996.

Washington Health Services, Inc. *The Home Care Plan.*

Great Republic Life Insurance Company's *Home Health Care Policy.*

Equitable Life & Casualty Insurance Company's *HomeCare Recovery Policy.*

Commonwealth National Life Insurance Company's *CompanionCare Home Health Care* Policy.

American Travellers Life Insurance Company, Long Term Care Insurance Policy Form ATL–LTC–6–IL.

Continental Casualty Company, Long Term Care Insurance Policy Form P1–21300–A (Annotated Specimen Contract).

Kanawha Insurance Company, Long Term Care Insurance Policy Form 80650.

Mutual Protective Insurance Company, Long Term Care Insurance Policy Form MP–LT692.

Pioneer Life Insurance Company of Illinois, Home Health Care Insurance Policy Form IHP–9468.

The Travelers Insurance Company, Long Term Care Insurance Policy Form LTC3.

Fries, B.E.: Letter to Carl J. Schramm, President, Health Insurance Association of America, Sep. 25, 1987.

New York State Department of Health Care Standards. "Resource Utilization Groups System: Nursing Home Reimbursement in New York State." (booklet) Jul. 1986.

Grimaldi, Paul L.: "The time is ripe for case–mix payments." *HealthWeek* p. 25, Jun. 6, 1988.

Morris, J.N., Hawes, C., Fries, B.E., et al.: "Designing the National Resident Assessment Instrument for Nursing Homes." The Gerontologist 30(3):293–307, 1990.

Clauser, S.B. and Fries, B.E.: "Nursing Home Resident Assessment and Case–Mix Classification: Cross–National Perspectives." *Health Care Financing Review* 13(4): 135–54, Summer 1992.

Fries, B.E., et al.: "Refining a Case–Mix Measure for Nursing Homes: Resource Utilization Groups (RUG III)." Unpublished Jun. 26, 1992.

Fries, B.E., et al.: "Mental Dysfunction and Resource Use in Nursing Homes." Unpublished Sep. 23, 1992.

Fries, B.E., et al.: "Refining a Case–Mix Measure for Nursing Homes: Resource Utilization Groups (RUG–111)" Medical Care 32(7):668–85, 1994.

Williams, B.C., Fries, B.E., et al.: "Activities of Daily Living and Costs in Nursing Homes." *Health Care Financing Review* (15(4): 117–35, Summer 1994.

Schultz, B.M., et al.: "RUG–II Impacts on Long–Term Care Facilities In New York." *Health Care Financing Review* 16(2):85–99, Winter 1994.

"Creating a MEDPAR Analog to the RUG–III Classification System." *Health Care Financing Review* 16(2):101–26, Winter 1994.

"Proposed Medicare Skilled Nursing Facility Prospective Payment System." *Health Care Financing Review* 78–9, 1995 Statistical Supplement.

"Distribution of Medicare Covered Skilled Nursing Facility Stays, by State of Provider and Major RUG–III Groups: Calendar Year 1993." *Health Care Financing Review* 258–9, 1995 Statistical Supplement.

"Distribution of Medicare Covered Skilled Nursing Facility Stays, by State of Provider and Major RUG–III Groups: Calendar Year 1994." *Health Care Financing Review* 294–5, 1966 Statistical Supplement.

Hawes, C., Fries, B.E., et al.: "Reliability Estimates for The Minimum Data Set for Nursing Home Resident Assessment and Care Screening (MDS)." The Gerontologist Apr. 1995.

Head, B., et al.: "Outcomes for Home and Community Nursing in Integrated Delivery Systems." *Caring Magazine* pp. 50–56, Jan. 1997.

Figure 4

Reduction (Savings) in the Claims Cost of a Policy providing Nursing Home and Group Living Facility Benefits - per Patient
(prior to the application of the savings to provide added benefits, benefit enhancements and/or increased profitability)

| | | | | Nursing Home Policy, but NO Home Recovery Care Policy | | | | | | Nursing Home Policy, WITH Home Recovery Care Policy | | | | | | Patients with only NH Benefits | | | TOTAL |
|---|---|---|---|---|---|---|---|---|---|---|---|---|---|---|---|---|---|---|---|
| Max Daily Ben = $165 | | | | Assumed Annual Interest Rate, Both Scenarios = 6.00% | | | | | | | | | | | | Maximum Benefit | $40,000 | | |
| | | | | Elimination Period #1 (Days) = 100 | | | | | | Elimination Period #2 (Days) = 100 | | | | | | | | | |
| Patient Category | ADL Range | NH Patient Distrib | Daily NH Ben | Assumed Months of NH Stay | Months of Paid NH Bens | Weighted Monthly Benefit | Weighted PV of All NH Paymts (Claims Cost) | | Qualifies Medicare's NH Bens? | % Care at Home | Patient Distrib HRC+NH | Months of Avail HRC Bens | Months of Paid NH Bens | Weighted Mo NH Benefit | Weighted PV of All NH Pymts | Patient Distrib NH only | Weighted Mo NH Benefit | Weighted PV of All NH Pymts | Weighted PV of All NH Payments (Claims Cost) |
| Extensive Services | | | | | | | | | | | | | | | | | | | |
| 3+ Types | 7-18 | 0.2% | $165 | 4.0 | 0.71 | $10.04 | $7.03 | | Y | 50% | 0.10% | 2.50 | 0.00 | $0.00 | 0.00 | 0.10% | $5.02 | $3.52 | $3.52 |
| 2 Types | 7-18 | 0.5% | 123 | 3.0 | 0.00 | 18.72 | 0.00 | | Y | 60% | 0.30% | 2.00 | 0.00 | 0.00 | 0.00 | 0.20% | 7.49 | 0.00 | 0.00 |
| 1 Type | 7-18 | 1.4% | 94 | 2.0 | 0.00 | 40.06 | 0.00 | | Y | 75% | 1.05% | 2.00 | 0.00 | 0.00 | 0.00 | 0.35% | 10.01 | 0.00 | 0.00 |
| Rehabilitation | | | | | | | | | | | | | | | | | | | |
| | 16-18 | 1.1% | 128 | 3.0 | 0.00 | 42.86 | 0.00 | | Y | 80% | 0.88% | 3.00 | 0.00 | 0.00 | 0.00 | 0.22% | 8.57 | 0.00 | 0.00 |
| | 7-15 | 5.4% | 117 | 2.0 | 0.00 | 192.30 | 0.00 | | Y | 80% | 4.32% | 3.00 | 0.00 | 0.00 | 0.00 | 1.08% | 38.46 | 0.00 | 0.00 |
| | 4-6 | 0.8% | 108 | 1.0 | 0.00 | 26.30 | 0.00 | | Y | 80% | 0.64% | 3.00 | 0.00 | 0.00 | 0.00 | 0.16% | 5.26 | 0.00 | 0.00 |
| Special Care | | | | | | | | | | | | | | | | | | | |
| | 17-18 | 4.0% | 88 | 4.0 | 0.71 | 107.14 | 74.99 | | Y | 50% | 2.00% | 3.00 | 0.00 | 0.00 | 0.00 | 2.00% | 53.57 | 37.50 | 37.50 |
| | 14-16 | 4.9% | 83 | 3.0 | 0.00 | 123.79 | 0.00 | | Y | 60% | 2.94% | 2.50 | 0.00 | 0.00 | 0.00 | 1.96% | 49.52 | 0.00 | 0.00 |
| | 7-13 | 1.2% | 78 | 1.0 | 0.00 | 28.49 | 0.00 | | Y | 75% | 0.90% | 2.00 | 0.00 | 0.00 | 0.00 | 0.30% | 7.12 | 0.00 | 0.00 |
| Clinically Complex | | | | | | | | | | | | | | | | | | | |
| | 17-18 | 4.4% | 81 | 4.0 | 0.71 | 108.48 | 75.93 | | Y | 60% | 2.64% | 2.50 | 0.00 | 0.00 | 0.00 | 1.76% | 43.39 | 30.37 | 30.37 |
| | 11-16 | 14.1% | 74 | 2.5 | 0.00 | 317.58 | 0.00 | | Y | 75% | 10.57% | 2.50 | 0.00 | 0.00 | 0.00 | 3.53% | 79.40 | 0.00 | 0.00 |
| | 6-10 | 6.3% | 69 | 2.0 | 0.00 | 132.31 | 0.00 | | Y | 80% | 5.04% | 2.00 | 0.00 | 0.00 | 0.00 | 1.26% | 26.46 | 0.00 | 0.00 |
| | 4-5 | 6.5% | 59 | 1.0 | 0.00 | 116.73 | 0.00 | | Y | 90% | 5.85% | 2.00 | 0.00 | 0.00 | 0.00 | 0.65% | 11.67 | 0.00 | 0.00 |
| Cognitive & Behavior | | | | | | | | | | | | | | | | | | | |
| | 6-10 | 5.9% | 63 | 30.0 | 26.71 | 113.14 | 2,776.76 | | N | 90% | 5.31% | 6.00 | 20.71 | 101.82 | 1,939.99 | 0.59% | 11.31 | 277.68 | 2,217.66 |
| | 4-5 | 5.8% | 52 | 30.0 | 26.71 | 91.80 | 2,253.08 | | N | 90% | 5.22% | 6.00 | 20.71 | 82.62 | 1,574.12 | 0.58% | 9.18 | 225.31 | 1,799.43 |
| Reduced Physical Functions | | | | | | | | | | | | | | | | | | | |
| | 16-18 | 7.5% | 73 | 30.0 | 26.71 | 166.65 | 4,090.06 | | N | 90% | 6.75% | 3.00 | 23.71 | 149.98 | 3,296.39 | 0.75% | 16.66 | 409.01 | 3,705.40 |
| | 11-15 | 12.4% | 68 | 30.0 | 26.71 | 256.65 | 6,299.07 | | N | 90% | 11.16% | 4.50 | 22.21 | 230.98 | 4,737.54 | 1.24% | 25.66 | 629.91 | 5,367.44 |
| | 9-10 | 2.3% | 62 | 30.0 | 26.71 | 43.40 | 1,065.28 | | N | 90% | 2.07% | 6.00 | 20.71 | 39.06 | 744.26 | 0.23% | 4.34 | 106.53 | 850.79 |
| | 6-8 | 2.5% | 58 | 30.0 | 26.71 | 44.13 | 1,083.21 | | N | 90% | 2.25% | 6.00 | 20.71 | 39.72 | 756.79 | 0.25% | 4.41 | 108.32 | 865.11 |
| | 4-5 | 13.0% | 50 | 30.0 | 26.71 | 197.84 | 4,855.78 | | N | 90% | 11.70% | 6.00 | 20.71 | 178.06 | 3,392.50 | 1.30% | 19.78 | 485.58 | 3,878.08 |
| | | | | | Revised Claims Cost per Patient = | | $22,581.21 | | | | | | | | | Claims Cost per Patient = | | | $18,755.29 |
| | | | | | | | | | | | | | | | | Savings in Claims Cost per Patient = | | | $3,825.92 |

Figure 5

Reduction (Savings) in the Claims Cost of a Policy providing Nursing Home and Group Living Facility Benefits - per Patient (after the application of the savings to reduce the Elimination Period, i.e., the waiting period before benefits can begin, from 100 days to 0 days)

| A | B | C | D | E | F | G | H | I | J | K | L | M | N | O | P | Q | R | S | T |
|---|---|---|---|---|---|---|---|---|---|---|---|---|---|---|---|---|---|---|---|
| | Nursing Home Policy, but NO Home Recovery Care Policy | | | | | | | | Nursing Home Policy, WITH Home Recovery Care Policy = | | | | | | | $40,000 | Maximum Benefit | | |
| | Assumed Annual Interest Rate, Both Scenarios = 6.00% | | | | | | | | Elimination Period #2 (Days) = 0 | | | | | | | | | | |
| Max Daily Ben = $165 | | | | Elimination Period #1 (Days) = 100 | | | | | Patients eligible for both HRC and NH Benefits | | | | | | | Patients with only NH Benefits | | | TOTAL |
| Patient Category | ADL Range | NH Patient Distrib | Daily NH Ben | Assumed Months of NH Stay | Months of Paid NH Bens | Weighted Monthly Benefit | Weighted PV of All NH Paymts (Claims Cost) | | Qualifies Medicare's NH Bens? | % Care at Home | Patient Distrib HRC+NH | Months of Avail HRC Bens | Months of Paid NH Bens | Weighted Mo NH Benefit | Weighted PV of All NH Pymts | Patient Distrib NH only | Weighted Mo NH Benefit | Weighted PV of All NH Pymts | Weighted PV of All NH Payments (Claims Cost) |
| Extensive Services | | | | | | | | | | | | | | | | | | | |
| 3+ Types | 7-18 | 0.2% | $165 | 4.0 | 0.71 | $10.04 | $7.03 | | Y | 50% | 0.10% | 2.50 | 0.00 | $0.00 | $0.00 | 0.10% | $5.02 | $3.52 | $3.52 |
| 2 Types | 7-18 | 0.5% | 123 | 3.0 | 0.00 | 18.72 | 0.00 | | Y | 60% | 0.30% | 2.00 | 0.00 | 0.00 | 0.00 | 0.20% | 7.49 | 0.00 | 0.00 |
| 1 Type | 7-18 | 1.4% | 94 | 2.0 | 0.00 | 40.06 | 0.00 | | Y | 75% | 1.05% | 2.00 | 0.00 | 0.00 | 0.00 | 0.35% | 10.01 | 0.00 | 0.00 |
| Rehabilitation | | | | | | | | | | | | | | | | | | | |
| | 16-18 | 1.1% | 128 | 3.0 | 0.00 | 42.86 | 0.00 | | Y | 80% | 0.88% | 3.00 | 0.00 | 0.00 | 0.00 | 0.22% | 8.57 | 0.00 | 0.00 |
| | 7-15 | 5.4% | 117 | 2.0 | 0.00 | 192.30 | 0.00 | | Y | 80% | 4.32% | 3.00 | 0.00 | 0.00 | 0.00 | 1.08% | 38.46 | 0.00 | 0.00 |
| | 4-6 | 0.8% | 108 | 1.0 | 0.00 | 26.30 | 0.00 | | Y | 80% | 0.64% | 3.00 | 0.00 | 0.00 | 0.00 | 0.16% | 5.26 | 0.00 | 0.00 |
| Special Care | | | | | | | | | | | | | | | | | | | |
| | 17-18 | 4.0% | 88 | 4.0 | 0.71 | 107.14 | 74.99 | | Y | 50% | 2.00% | 3.00 | 0.00 | 0.00 | 0.00 | 2.00% | 53.57 | 37.50 | 37.50 |
| | 14-16 | 4.9% | 83 | 3.0 | 0.00 | 123.79 | 0.00 | | Y | 60% | 2.94% | 2.50 | 0.00 | 0.00 | 0.00 | 1.96% | 49.52 | 0.00 | 0.00 |
| | 7-13 | 1.2% | 78 | 1.0 | 0.00 | 28.49 | 0.00 | | Y | 75% | 0.90% | 2.00 | 0.00 | 0.00 | 0.00 | 0.30% | 7.12 | 0.00 | 0.00 |
| Clinically Complex | | | | | | | | | | | | | | | | | | | |
| | 17-18 | 4.4% | 81 | 4.0 | 0.71 | 108.48 | 75.93 | | Y | 60% | 2.64% | 2.50 | 0.00 | 0.00 | 0.00 | 1.76% | 43.39 | 30.37 | 30.37 |
| | 11-16 | 14.1% | 74 | 2.5 | 0.00 | 317.58 | 0.00 | | Y | 75% | 10.57% | 2.50 | 0.00 | 0.00 | 0.00 | 3.53% | 79.40 | 0.00 | 0.00 |
| | 6-10 | 6.3% | 69 | 2.0 | 0.00 | 132.31 | 0.00 | | Y | 80% | 5.04% | 2.00 | 0.00 | 0.00 | 0.00 | 1.26% | 26.46 | 0.00 | 0.00 |
| | 4-5 | 6.5% | 59 | 1.0 | 0.00 | 116.73 | 0.00 | | Y | 90% | 5.85% | 2.00 | 0.00 | 0.00 | 0.00 | 0.65% | 11.67 | 0.00 | 0.00 |
| Cognitive & Behavior | | | | | | | | | | | | | | | | | | | |
| | 6-10 | 5.9% | 63 | 30.0 | 26.71 | 113.14 | 2,776.76 | | N | 90% | 5.31% | 6.00 | 24.00 | 101.82 | 2,229.68 | 0.59% | 11.31 | 314.45 | 2,544.13 |
| | 4-5 | 5.8% | 52 | 30.0 | 26.71 | 91.80 | 2,253.08 | | N | 90% | 5.22% | 6.00 | 24.00 | 82.62 | 1,809.18 | 0.58% | 9.18 | 255.15 | 2,064.32 |
| Reduced Physical Functions | | | | | | | | | | | | | | | | | | | |
| | 16-18 | 7.5% | 73 | 30.0 | 26.71 | 166.65 | 4,090.06 | | N | 90% | 6.75% | 3.00 | 27.00 | 149.98 | 3,723.09 | 0.75% | 16.66 | 463.17 | 4,186.27 |
| | 11-15 | 12.4% | 68 | 30.0 | 26.71 | 256.65 | 6,299.07 | | N | 90% | 11.16% | 4.50 | 25.50 | 230.98 | 5,394.69 | 1.24% | 25.66 | 713.33 | 6,108.03 |
| | 9-10 | 2.3% | 62 | 30.0 | 26.71 | 43.40 | 1,065.28 | | N | 90% | 2.07% | 6.00 | 24.00 | 39.06 | 855.40 | 0.23% | 4.34 | 120.64 | 976.04 |
| | 6-8 | 2.5% | 58 | 30.0 | 26.71 | 44.13 | 1,083.21 | | N | 90% | 2.25% | 6.00 | 24.00 | 39.72 | 869.80 | 0.25% | 4.41 | 122.67 | 992.46 |
| | 4-5 | 13.0% | 50 | 30.0 | 26.71 | 197.84 | 4,855.78 | | N | 90% | 11.70% | 6.00 | 24.00 | 178.06 | 3,899.09 | 1.30% | 19.78 | 549.89 | 4,448.97 |
| | | | | Revised Claims Cost per Patient = | | | $22,581.21 | | | | | | | | | Claims Cost per Patient = | | | $21,391.61 |
| | | | | | | | | | | | | | | | | Savings in Claims Cost per Patient = | | | $1,189.61 |

COMPUTER APPARATUS AND METHOD FOR GENERATING DOCUMENTATION USING A COMPUTED VALUE FOR A CLAIMS COST AFFECTED BY AT LEAST ONE CONCURRENT, DIFFERENT INSURANCE POLICY FOR THE SAME INSURED

I. TECHNICAL FIELD OF THE INVENTION

The present invention is in the field of digital electrical apparatus and methods for making and using the same, and products produced thereby. More particularly, the present invention is directed to a digital electrical apparatus and method for data processing and data management having particular utility in the field of insurance. Still more particularly, the present invention pertains to a method for making and using a digital electrical apparatus to process digital electrical signals to calculate a financial attribute of a first insurance policy affected by a concurrent second insurance policy insuring the same person, along with automated generation of related documentation.

II. BACKGROUND OF THE INVENTION

Traditional thinking is that each insurance policy stands on its own. Accordingly, people do not tend to think of an automobile insurance policy influencing a health insurance policy, or of a health insurance policy influencing a life insurance policy. Sometimes, an insurance company, or a group of companies having entered into a business relationship, will give a premium discount to make a sale of more than one policy to a person, e.g., if a consumer purchases automobile and homeowners insurance from the company or group of companies. So far as is known, such a discount involves giving up some of the respective profits for each policy individually, or passing to the consumer some of the savings in administrative expenses realized by the company or group of companies.

As another example, if different persons in the same family, e.g., spouses, are covered by the same type of insurance, e.g., nursing home insurance, an insurance company may give a premium discount to one or both spouses based on anticipated savings in claims costs that would accrue if one spouse became sick and was able to delay entry into a nursing home because the healthy spouse provided care in their home.

However, so far as is known, such discounts are distinctly different from this invention wherein a first insurance policy that can be sold without a second insurance policy is affected by the concurrent presence of the second insurance policy; the second insurance policy being for a risk different from that of the first insurance policy; the policies being for the same person; and the second policy affecting a claims cost of the first policy.

A more particular example involves a group of insurance policies collectively referred to as long-term care insurance. This group provides coverage to a person primarily for the risks of home health care and nursing home care, each of which can be covered in separate policies or combined in a single policy, and may include additional coverage for the person for the risks of community-based care, assisted living care, and/or care in any other type of setting approved by an insurance company.

Long-term care insurance policies were first offered to the public by insurance companies at about the time when Medicare came into being in 1966, a time in which the insurance industry was not known as being in the vanguard of computerization. These first policies were developed when almost everyone confined to a nursing home was elderly and unable to take care of themselves because of chronic cognitive or physical impairments. That is, their health conditions had deteriorated to the point that they were no longer able to care for themselves without the assistance of another person. They were not expected to recover from those conditions. (Anecdotal evidence strongly suggests that this stereotypical view of nursing home patients is still held by most people despite the fact that 8 of every 10 of today's nursing home admissions are patients sent there to recover following hospitalization.) And, health care provided in a patient's home by skilled medical professionals was virtually non-existent.

As a result, the first long-term care insurance policies covered only nursing home care. Pricing the policies was difficult because very little data—seemingly only the average length of stay and average daily cost of care—was available to assist insurers. Furthermore, computer modeling techniques and predictive tools apparently were not being utilized. Thus, the first policies provided fixed benefits without regard to patients' actual medical conditions, that is, their medical, physical, and mental states of health, at the time of claim.

Under a fixed-benefit arrangement, insured persons select a specific benefit amount at the time they apply for a policy. The benefit amount can be expressed in a daily, weekly, monthly, or other duration-specific periodic manner. The benefit amount can also be expressed as a flat amount that, upon qualification, will be paid regardless of the cost of the care received. Or, it can be expressed as a benefit limit in which case a patient's expenses will be paid up to the periodic limit. Under a fixed-benefit arrangement, neither the flat amount nor the limit can be increased solely because a patient's health condition deteriorates after the patient qualifies for benefits.

Sales of such nursing home policies remained low for almost twenty years, resulting in a corresponding low demand for advances in computer science as applied to such policies. Other than minor improvements, the policies continued to provide only nursing home benefits until two things occurred. First, surveys showed that 75% to 80% of all seniors strongly preferred to receive care at home; only 1% to 2% preferred a nursing home.

Second, beginning in October 1983, in response to rapidly rising hospital costs, Medicare began to reimburse hospitals using a prospective payment system based on Diagnosis Related Groups (DRGs). Before this change, seniors covered by Medicare remained hospitalized until, in most cases, they required only minimal assistance after discharge. This provided hospitals with a very strong financial incentive to keep patients hospitalized for as long as possible.

But, under the prospective payment system, each patient was assigned to one of 472 different DRGs, each of which had a specific dollar amount allotted to it. The dollar amount was based on the relative severity of the medical condition for the average patient. Except in extraordinary cases, Medicare paid the hospital that dollar amount for the patient's treatment, regardless of the severity of the patient's actual medical condition. In most cases, if the patient remained hospitalized too long, the hospital spent more for the patient's care than it received from Medicare. Thus, for the first time, hospitals had a very strong financial incentive to release patients before their Medicare money ran out.

In 1968, the average hospital stay for seniors was 14.2 days; in 1982, the last full year before the prospective payment system was implemented, it had dropped to 10.1 days; and, in 1996, the average hospital stay was only 6.6 days.

Today, almost half of all senior patients need skilled medical care—care that can't be provided by friends or family—during their recovery after release from a hospital. Technological advances now allow virtually all care provided in a nursing home to be provided in patients' homes. Thus, whether patients recover in a nursing home or in their own home now depends more often on what they can afford. Because home health care for recuperating patients is frequently more expensive than nursing home care, and because the combination of Medicare and private Medigap insurance policies can pay 100% of the costs for nursing home care during the first 100 days, most recuperating patients are sent to nursing homes even though 75% to 80% strongly prefer to recover at home.

Whereas 30 years ago most nursing home patients were old, feeble, and at the end of their lives, today's "quicker and sicker" hospital discharges have dramatically changed the type of patients in nursing homes. Today, approximately 72% of the seniors who are sent to nursing homes typically stay for less than 90 days while they receive skilled medical care to recover after a hospital confinement. Contrary to the fears of many seniors, nursing homes are no longer "the end of the road;" indeed, 91% of Medicare's nursing home patients recover and are sent home to resume their lives.

However, the inventors herein have observed a problem apparently unrecognized in the insurance industry—an inadequate response to the shift in the delivery of health care services. Newer versions of the old policies did include benefits for home health care, but with very little reliable information available to actuaries, insurers simply extended their old concepts for nursing home benefits to the new home health care benefits and increased their premiums accordingly. The insurers did not change the way they determined benefit amounts for nursing home or home health care, irrespective of the wide variance in the costs of providing care for seniors with different health conditions.

At first, most companies limited home health care benefit amounts to 50% of the amounts payable for nursing home care, but the policies still didn't sell very well. They were too expensive for most people. Gradually, companies began to offer newer policies in which home health care was optional, and other policies that provided only home health care benefits. And, many companies began to offer equal benefits for both home health care and nursing home care. While the rate of sales did increase somewhat, the fact remains that, after 30 years of sales, only about 2% of people age 50 and older are covered by these policies even though long-term care represents the largest potentially devastating financial risk for most seniors.

The newest versions of the policies include additional improvements. Benefits are now available for care provided in alternatives to nursing homes such as assisted living facilities. But all known policies still use the old fixed-benefit concept, with benefit amounts crudely based on where the care is provided, and for home health care, sometimes on the type of care provided The inventors herein have observed a general lack of appreciation by the insurance industry of the problems that can be caused by not basing benefits on the widely varying costs of providing care to patients with very different, specific health conditions; such problems can cause significant financial and emotional harm, particularly for people recovering after a hospitalization.

Home health care frequently costs more than nursing home care; it is one-on-one care whereas nursing home care is shared among many patients. This is particularly true for patients recovering from more severe medical conditions. For example, if a patient requires 24-hour-a-day nursing care during the first days of recovery, home health care typically costs $30 an hour ($720 a day). But, very few of today's policies include benefit amounts greater than $150 to $200 a day. Yet, most policies with home health care benefits are sold to seniors with a strongly implied promise that they will keep people out of a nursing home. Thus, seniors who count on their policies to keep them at home often find themselves recovering in nursing homes, unless they or their families spend hard-earned savings to pay for expenses they thought would be covered by their policies.

Home health care patients usually rely on a combination of their long-term care insurance policies and Medicare to pay for their care. While it does pay for 100% of the home health care required by some patients, Medicare on average pays only 45% of all billed home health care expenses. Because an insurance policy with home health care benefits can be inadequate to meet a patient's needs, particularly if highly-skilled care (nurses or therapists) is also needed, the patient, or the patient's family, must somehow make up the difference if the patient is to recover at home.

To save money, friends and family members often provide non-medical assistance during a patient's recovery. This costs caregivers tens of millions of dollars in lost wages each year. And, a recent study found that 31% of the families of seriously-ill patients spent most or all of their life savings on the unreimbursed costs of home health care. Furthermore, Medicare provides no benefits for maintenance or custodial care at home. Thus, people who have developed cognitive impairment, e.g., Alzheimer's Disease or senile dementia, or lost the ability to perform some of the normal activities of daily living without the assistance of another person must rely upon friends and family, their savings and their long-term care insurance policies to provide and pay for the care they need.

These conditions are degenerative; that is, as time passes, patients need ever-increasing care. Once their benefit maximums have been reached, today's fixed-benefit insurance policies force patients to spend their life savings more and more rapidly until they eventually become impoverished and qualify for Medicaid. As a result, patients' spouses and their families often suffer a steadily decreasing standard of living as their assets diminish. In many cases, especially when home health care is no longer affordable, this results in premature confinement in a Medicaid nursing home, with the concurrent loss of independence and privacy for the patient, an emotionally devastating event.

In 1984, Jerry D. Wilson, a co-inventor herein, recognized the inadequacy of fixed-benefit home health care insurance arrangements and developed an insurance benefit system that was much more closely related to the home recovery care needs of patients discharged from hospitals. Wilson reasoned that the cost of a recovering patient's home health care should logically bear a direct relationship to the severity of the medical condition for which the patient was hospitalized. Thus, he based his benefit arrangement on Medicare's Diagnosis Related Groups (DRGs). That is, a specific aggregate dollar amount to pay for home health care was assigned as a maximum benefit limit to each of his DRG-based patient categories, with no daily, weekly, monthly or other duration-specific limits imposed on benefit payments. After incorporation into a home health care insurance policy, his rationale was validated over a 6-year development period during which it was found that more than three out of every four claimants had their expenses for their episode of home health care paid in full before they reached the maximum benefit limit for their medical conditions. As a result, these patients recovered at home, where they wanted to be, usually with little or no out-of-pocket expenses. In other words, their financial health remained intact, thereby allowing them to retain their standard of living after recovery.

Wilson first offered policies incorporating his insurance benefit system to residents of the State of Washington in January 1985 through his own firm, Washington Health Services, Inc. Later, he licensed his system to three insurance companies as the basis for their own home health care policies: Equitable Life & Casualty Insurance Company, Great Republic Life Insurance Company and Commonwealth National Life Insurance Company. Thus far, more than 6,000 such policies have been sold. However, in spite of the success of Wilson's system in providing recuperating patients with sufficient funds to recover at home instead of a nursing home, his system is not known to have been used for any purpose other than as the basis for the benefit arrangement under home health care insurance policies.

As home health care policies based on Wilson's system allowed more patients to recover at home, the number of patients who had to recuperate in nursing homes was reduced. Furthermore, for recuperating patients who spent the early days of their recovery in nursing homes, the average duration of their stays was reduced because policies based on his system provide sufficient funds for more expensive care at home. However, insurance companies have not reduced the premiums of their nursing home policies sold in conjunction with home health care policies based on his system, even though their nursing home claims costs are reduced when people are insured concurrently under policies based on Wilson's system.

III. SUMMARY OF THE INVENTION

The inventors herein have discovered a well-established pattern or problem within the insurance industry: That is, insurers charge the same premium for a first insurance policy regardless of whether the first insurance policy is issued with or without a concurrent second insurance policy; the second insurance policy being for a risk different from that of the first insurance policy; the second insurance policy affecting a claims cost of the first insurance policy; and the insurance policies being for the same person. This can reduce or deny benefit flexibility and/or premium savings to an insured person when he or she establishes an insurance program that includes two or more such policies.

A. Objects and Advantages

In view of the foregoing, the inventors herein have made a first innovation in the field of insurance that has created a need for a second innovation in the field of computer science, the latter being the subject of this patent application. Thus, an object of the invention for which a patent is sought is overcoming some or all of the drawbacks indicated herein by a computerized apparatus and method.

It is a more particular object of the present invention to provide an apparatus and method for using a digital electrical computer system to process digital electrical signals to generate printed documentation for a first insurance policy affected by a concurrent second insurance policy.

It is a further object of the present invention to provide an apparatus and method including a digital electrical computer apparatus including a digital computer having a processor, the processor electrically connected to an input device, for receiving input data and for converting the input data into input electrical signals, and to a printer, for converting the output electrical signals into printed documentation for a first insurance policy when a claims cost of the first insurance policy is affected by a concurrent second insurance policy, wherein the step of providing includes programming the processor to produce a programmed processor controlling the digital electrical computer apparatus and changing the input electrical signals into the output electrical signals in accordance with said method.

It is still a further object of the present invention to provide an apparatus and method to enable receiving, as part of the input data, actuarial assumptions defining a first insurance policy for a first risk having a claims cost reflecting a concurrent second insurance policy for a second risk; the second risk being different from the first risk; the policies being for the same insured person; and the second policy affecting a claims cost of the first policy.

It is yet another object of the present invention to provide an apparatus and method to enable receiving, as part of the input data, actuarial assumptions defining a first insurance policy for a first risk, and actuarial assumptions defining a second insurance policy for a second risk, the first and second insurance policies having claims costs reflecting a concurrent third insurance policy for a third risk; the second risk being different from the first risk, and the third risk being different from both the first risk and the second risk; the policies being for the same insured person; and the third policy affecting a claims cost of the first policy and a claims cost of the second policy.

It is a preferred object of the present invention to provide an apparatus and method for carrying out the changing of the input electrical signals into the output electrical signals so as to include, by utilizing an appropriate computational filter, a computed premium for said first insurance policy, or a computed premium for each of said first and second insurance policies; and generating printed insurance documentation, including the computed premium or premiums, at said printer.

It is another preferred object of the present invention to provide an apparatus and method for efficiently calculating a change in a claims cost of a first insurance policy that is attributable to the presence of a concurrent second insurance policy; and generating printed insurance documentation, including the computed change in the claims cost, at said printer.

It is still another preferred object of the present invention to provide an apparatus and method for calculating and carrying out a reduction in a claims cost of a life insurance policy that is attributable to the presence of a concurrent second insurance policy providing health insurance.

It is a further preferred object of the present invention to provide an apparatus and method for calculating and carrying out a reduction in a claims cost of a medical insurance policy that is attributable to the presence of a concurrent second insurance policy providing home health care insurance.

It is a further preferred object of the present invention to provide an apparatus and method for calculating and carrying out a reduction in an insurer's claims cost of a policy providing hospitalization insurance that is attributable to the presence of a concurrent second home health care insurance policy.

It is a further preferred object of the present invention to provide an apparatus and method for calculating and carrying out a reduction in a claims cost of an insurance policy providing fixed benefits for long-term care patients in nursing homes and other group living arrangements such as continuing care retirement communities, assisted living facilities, etc., that is attributable to the presence of a concurrent second insurance policy providing home health care insurance.

It is a further preferred object of the present invention to provide an apparatus and method for calculating and carrying out a reduction in a claims cost of a first insurance policy providing fixed benefits for recuperating patients in nursing homes and other group living arrangements, and a reduction in a claims cost of a concurrent second insurance policy providing hospitalization benefits, that is attributable to the presence of a concurrent third insurance policy providing home health care insurance.

It is yet another preferred object of this invention to provide an automated apparatus and method for calculating and carrying out a reduction in a claims cost of providing benefits for patients in nursing homes and other group living arrangements under a first insurance policy having a benefit arrangement based on the related patent application bearing Ser. No. 08/843,345 and entitled, "Apparatus and Method for Determining Insurance Benefit Amounts Based on Groupings of Long-term Care Patients with Common Characteristics," (e.g., insurance policy provides benefit amounts for patients in a group living arrangement, the benefit amounts varying according to patient care categories) that is attributable to the presence of a concurrent second insurance policy providing home health care insurance.

Yet one more representative object of the present invention is to provide an apparatus and method for calculating and carrying out a reduction in a claims cost of a first insurance policy providing benefits for patients in nursing homes and other group living arrangements that is attributable to the presence of a concurrent second insurance policy providing home health care insurance under a benefit arrangement based on Wilson's system, e.g., an insurance policy having maximum aggregate benefit limits for home health care, the benefits varying according to relative severity of patient medical conditions.

Yet another representative object of the present invention to provide an apparatus and method for the foregoing such that the resultant reduction (savings) in a claims cost of the first insurance policy can then be used to reduce the premiums charged to consumers; or by utilizing an appropriate computational filter to add additional benefits and/or coverage at no additional cost to consumers; and/or to increase the profitability of the insurer's policy, without increasing the insurer's financial risk.

These and other objects and advantages of this invention will become apparent from a consideration of the figures and ensuing description.

B. Summary of the Invention

These and other objects of the present invention, as apparent from the specification as a whole, are carried out by providing an improved digital electrical computer apparatus and method for calculating a financial attribute of a first insurance policy affected by the presence of a concurrent second insurance policy, especially where insured contingencies, risks, and/or perils of the two policies are different, but where the benefits of one policy reduce a claims cost of the other policy. The resulting savings in a claims cost of the first policy can then be used to reduce premiums charged to consumers, to add additional benefits and/or coverage at no additional premium charge to consumers, and/or to increase the insurance company's profitability.

For example, it is accepted in the insurance industry that if a health insurance policy pays benefits for wellness services such as physical exams, mammographies, pap smears, prostate exams, PSA tests and lifestyle counseling (smoking cessation, weight loss, exercise, etc.), more people will utilize those services than would be the case if the health insurance policy did not pay benefits for wellness services. Furthermore, it is accepted in the medical industry that people who regularly utilize such wellness services will, on average, live longer. Therefore, the inventors herein have inferred that an insurer with a health insurance policy that pays benefits for wellness services will experience a reduction in a claims cost of providing a life insurance policy to the same group of people because those people will tend to live longer and have lower mortality rates that other groups of people not similarly insured.

Consider another example. Most medical insurance policies include only incidental benefits for the contingency of home health care because recuperative care following a hospitalization can cost more if delivered in a patient's home than if delivered in a nursing home, particularly if skilled recuperative care is involved. As a result, a hospital patient is often sent to a nursing home to recover if a nursing home bed is available, or kept in the hospital until he or she no longer requires skilled medical care during recuperation. On the other hand, if the hospital patient were also insured under a second insurance policy whose home health care benefits were based on Wilson's system, sufficient funds would be available in many cases to pay for the full cost of skilled medical care in the patient's home. The inventors have inferred that such home health care benefits will reduce the average length of a hospital stay, thereby reducing an insurance company's claims cost of providing the medical insurance coverage.

Under the present invention, the second insurance policy can overcome a failing common to fixed-benefit insurance arrangements for home health care; that is, benefit amounts available under the fixed-benefit policies can be inadequate to pay for recuperative care in patients' homes. Thus, recovering patients must often be put into nursing homes to receive the care they need, especially if that care must be provided by a skilled medical professional. As a result, fixed-benefit policies that provide benefits for nursing home care must be priced higher than would otherwise be necessary. On the other hand, a home health care insurance policy with its benefit arrangement based on Wilson's system can provide larger benefit amounts for many recuperating patients, without any daily benefit limits, thereby allowing them to be able to afford to receive their care in their own homes without going to a nursing home, or to return home sooner after a short-duration stay in a nursing home to receive intensive recuperative care. And, for stereotypical long-term care patients with degenerative conditions, a home health care insurance policy with its benefit arrangement based on Wilson's system can allow many to remain home longer before ultimately moving to a nursing home or other type of group living facility. Thus, the inventors herein have inferred that a policy with its benefit arrangement based on Wilson's system can reduce the percentage of recovering patients who must go to a nursing home, the lengths of stay in a nursing home for recovering patients, and the lengths of stay in a nursing home or other type of group living facility for stereotypical patients with degenerative conditions. These reductions in the frequency and duration of nursing home stays reduce an insurer's claims cost of providing insurance for patients in nursing homes and other group living facilities.

Insurance policies with home health care benefits based on Wilson's system have successfully kept many patients out of nursing homes and other group living arrangements, and reduced the lengths of stay in nursing homes and other group living arrangements for many other patients. Thus, when such a home health care policy (i.e., a policy having primary benefits for maintenance care, recovery care, etc. of a patient at home) is purchased by a consumer (insured) together with a policy providing coverage for patient stays in nursing homes and other group living arrangements based on the related patent application, these reductions in the frequency and duration of said patient stays reduce an insurer's claims cost of providing insurance benefits for such patient stays.

The invention includes apparatus, method for making the apparatus, and method for using the apparatus, articles of manufacture (e.g., program on a storage medium) along with necessary intermediates, most efficiently summarized with reference to the method for using the apparatus. Accordingly, the invention includes a method for using an apparatus to process digital electrical signals to generate documentation using a computed value for claims cost of a first insurance policy affected by at least one concurrent, different insurance policy, the method including the steps of: providing an apparatus including a digital electrical computer having a processor, the processor electrically connected to an input device, for receiving input data and for converting the input data into input electrical signals, and to a printer, for converting the output electrical signals into printed documentation, the processor being programmed to control the apparatus in changing the input electrical signals into the output electrical signals in accordance with said method; receiving, as part of the input data, actuarial assumptions defining a first insurance policy for a first risk having a claims cost affected by at least a second concurrent insurance policy for a respectively different risk for an insured person (preferably the policies are from a group consisting of life, accident, disability, health, and a combination thereof, where a first claim coverage can influence the likelihood or extent of a subsequent claim); wherein the changing of the input electrical signals into the output electrical signals includes computing a first value for the claims cost for the first insurance policy; and using the first value to generate printed insurance documentation at said printer.

The method can be carried out such that the changing of the input electrical signals into the output electrical signals includes computing a second value representing an extent to which the claims cost for the first insurance policy is influenced by the second insurance policy. More particularly, the invention can be carried out such that the extent represents a savings in claims cost for the first insurance policy, and wherein the changing of the input electrical signals into the output electrical signals includes applying the savings in claims cost, at least partially, as an offset to a premium for the first insurance policy when it is concurrently in force along with the second insurance policy; and wherein the step of generating printed insurance documentation includes generating the reduced premium cost. Even more particularly, the invention can be carried out such that the extent represents a savings in claims cost for the first insurance policy, and wherein the changing of the input electrical signals into the output electrical signals includes applying the savings in claims cost, at least partially, as an offset to a cost for providing at least one additional benefit to the first insurance policy when it is concurrently in force along with the second insurance policy; and wherein the step of generating printed insurance documentation includes generating a representation of the at least one enhanced benefit. Still more particularly, the invention can be carried out such that the extent represents a savings in claims cost for the first insurance policy, and wherein the changing of the input electrical signals into the output electrical signals includes applying the savings in claims cost, at least partially, as an offset to a cost for providing at least one benefit enhancement to the first insurance policy when it is concurrently in force along with the second insurance policy; and wherein the step of generating printed insurance documentation includes generating a representation of the at least one enhanced benefit. Ever more particularly, the invention can be carried out such that the extent represents a savings in claims cost for the first insurance policy, and wherein the changing of the input electrical signals into the output electrical signals includes applying the savings in claims cost, at least partially, to a value reflecting profit for the insurer of the first insurance policy.

In any of the foregoing, the actuarial assumptions can reflect that the first insurance policy is for life insurance and the second insurance policy is for health insurance; that the first insurance policy is for life insurance and the second insurance policy is for medical insurance; that the first insurance policy is for medical insurance and the second insurance policy is for home health care insurance; that the first insurance policy provides hospitalization insurance benefits, and the second insurance policy is for home health care insurance; that the first insurance policy provides benefits for patients in a group living arrangement, said benefits not being based on defined patient-care categories, and the second insurance policy is for home health care insurance; that the first insurance policy provides benefits for patients in a group living arrangement, said benefits not being based on defined patient-care categories, and the second insurance policy having maximum aggregate benefit limits for home health care, the benefit limits varying according to relative severity of patient medical conditions; and/or that the first insurance policy provides duration-specific benefits for patients in a group living arrangement, the benefits varying according to defined patient-care categories, and the second insurance policy having maximum aggregate benefit limits for home health care, the benefit limits varying according to relative severity of patient medical conditions.

In a more refined version of the invention, the method can be carried out wherein the at least one other concurrent insurance policy for a respectively different risk for an insured person includes a third insurance policy; and wherein the changing of the input electrical signals into the output electrical signals includes computing a third value representing an extent to which the claims cost for one of the first insurance policy and the second insurance policy is influenced by the third policy. More specifically, the method can further include the step of: applying at least a portion of the third value to a value representing a member of a group consisting of reduced premium, an additional benefit, a benefit enhancement, an increase in profit, and a combination thereof.

Note that the coverages may or may not be in the same insurance policy. An advantage of having the coverages in the same policy is that administration of such policies is more efficient than is the case where the one policy is replaced by several policies. An advantage of having the coverages in more than one policy is that the policies can be provided by different insurers.

The apparatus corresponding to the foregoing method, as well as the method of making the apparatus carry out the foregoing method are also contemplated as the invention. Additionally, the memory media, e.g., a diskette, containing a computer program, and the data corresponding to insurance documentation, are viewed as being part of the invention.

More particularly, the present invention involves an improved method and apparatus for computing a premium for a first insurance policy reflecting the presence of a concurrent second insurance policy whose insured contingencies, risks and/or perils are different from those of the first policy, but whose benefits reduce a claims cost of providing insurance benefits under the first policy, the first and second policies insuring the same person, wherein the improvement includes the steps of:

1. providing an appropriately-programmed programmable computer system;
2. inputting actuarial assumptions for the first insurance policy, said actuarial assumptions reflecting the presence of the second insurance policy;
3. computing, by utilizing an appropriate computational filter, the premium for the first insurance policy; and
4. generating insurance documentation for the first insurance policy, including the computed premium, by the computer means.

Even more particularly, the present invention involves an improved method and apparatus for calculating and applying the reduction (savings) in a claims cost of insurance benefits for a first insurance policy that is attributable to the presence of a concurrent second insurance policy whose insured contingencies, risks and/or perils are different from those of the first policy, but whose benefits reduce the claims cost of providing insurance benefits under the first policy, the first and second policies insuring the same person, wherein the improvement includes the steps of:

1. providing an appropriately-programmed programmable computer system;
2. inputting actuarial assumptions for the first insurance policy, said actuarial assumptions reflecting the presence of the concurrent second insurance policy;
3. computing, by utilizing an appropriate computational filter, the claims cost for the first insurance policy based on the actuarial assumptions inputted in step 2;
4. inputting revised actuarial assumptions for the first insurance policy without consideration of the concurrent second insurance policy,
5. computing, by utilizing an appropriate computational filter, the revised claims cost for the first insurance policy based on the revised actuarial assumptions inputted in step 4;
6. computing, by subtracting the claims cost determined in step 3 from the revised claims cost determined in step 5, the reduction (savings) in the first insurance policy's claims cost attributable to the presence of the concurrent second insurance policy;
7. applying the savings, by utilizing an appropriate computational filter, to the provision of additional benefits and/or benefit enhancements for a person insured under the first insurance policy, and/or to increase the profitability of the first insurance policy for an insurer; and
8. generating insurance documentation for the first insurance policy, including the additional benefits, benefit enhancements, and/or increased profitability, by the computer means.

It is important to note that steps 2 through 5 can be rearranged without affecting the results of this embodiment of the invention provided that: the claims cost described in step 3 is always based on the actuarial assumptions described in step 2; the revised claims cost described in step 5 is always based on the revised actuarial assumptions described in step 4; and the claims cost is always subtracted from the revised claims cost.

C. BRIEF DESCRIPTION OF THE DRAWINGS

FIG. 4 is an illustration of the type of insurance documentation that can be produced through the application of this invention.

FIG. 5 is an illustration of the type of insurance documentation that can be produced through the application of this invention.

IV. DETAILED DESCRIPTION OF A PREFERRED EMBODIMENT

Figure 1:
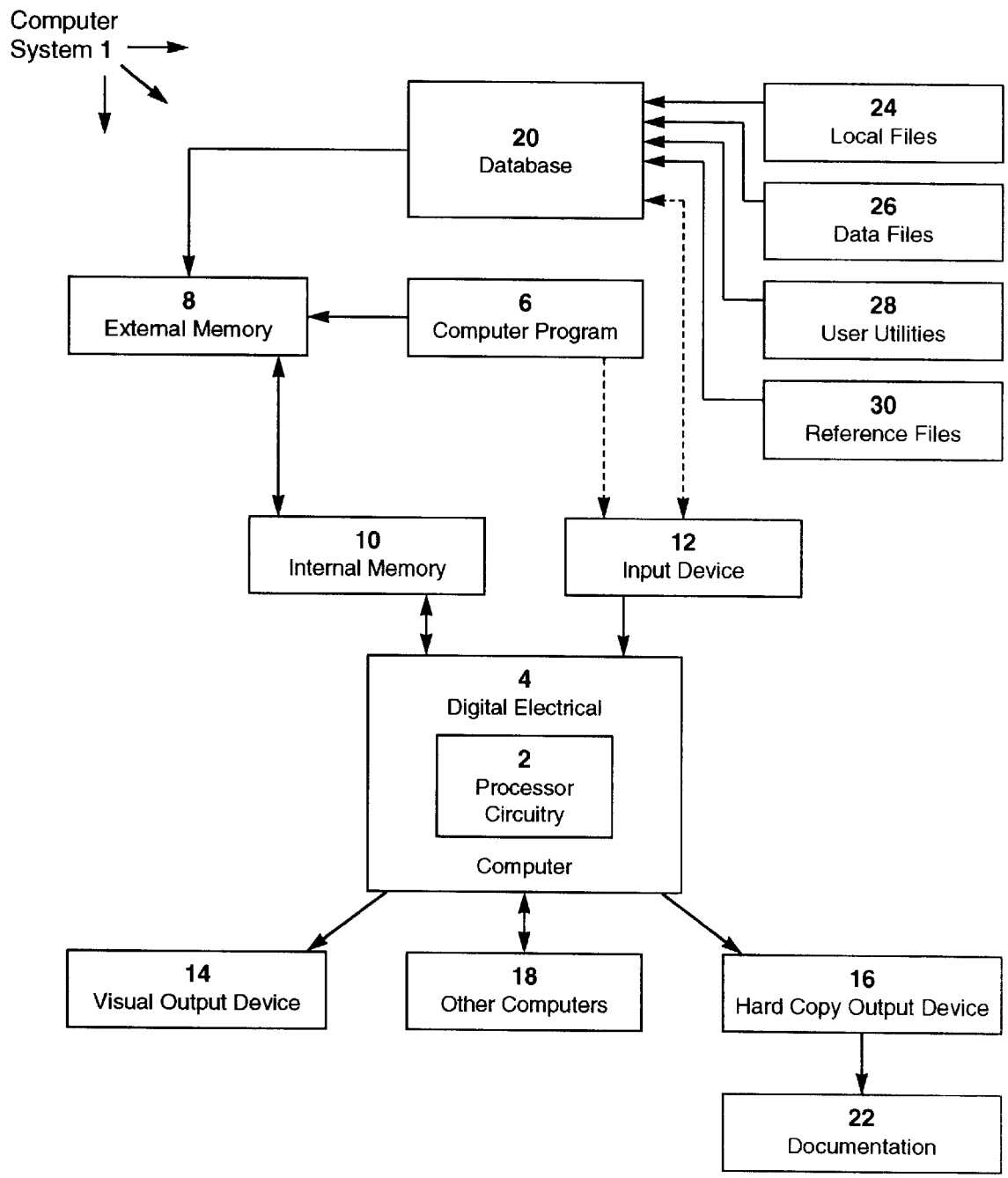
FIG. 1 is a representation of an apparatus in accordance with the present invention.

As a prefatory note, attention is drawn to the unique language of today's health care environment: (1) 72% of the seniors sent to nursing homes stay for less than 90 days, and (2) 83% of Medicare's home health care cases last for less than 90 days, but the insurance industry and its regulators often consider these patients to be a sub-set of "long-term care" patients because they receive care in the same settings, e.g., at home or in nursing homes, as stereotypical long-term care patients. While they are actually short-term recovering patients, the present specification has adopted the industry's nomenclature throughout the description of this invention. Thus, this invention not only applies to stereotypical long-term care patients who are unable to take care of themselves because of chronic cognitive or physical impairment, but it also applies to short-term recovering patients.

Most references in the description of this invention are to people age 65 and older (seniors); however, long-term care is also needed by younger people, but less frequently. Therefore, this invention applies to people of all ages.

Whenever the terms "insurance policy" or "policy," or the plurals thereof, are used in the present specification, they include any contract, or any part thereof, or any rider, endorsement, program, plan or any other arrangement under which one party undertakes to indemnify or guarantee another party against loss due to one or more specified contingencies, risks or perils, except the federal or state Medicare and Medicaid programs and their successors. "Coverage" means the specific contingency, risk or peril, or group of specific contingencies, risks and/or perils covered, and for which a benefit or benefits are provided, by the insurance arrangement. "Financial attribute" means a premium, discount, commission rate, claims cost, elimination period, benefit period, benefit amount, benefit limit, benefit coordination, exclusion, limitation, renewability, coverage duration, morbidity factor, mortality factor, expense, or any other similarly financially-related element of, or associated with, an insurance policy. "claims cost" or "claims costs" mean monies paid to claimants in accordance with an insurance arrangement and do not include any costs associated with administration or adjudication of claims. "Insurance company," "company," or "insurer," or the plurals thereof, include Blue Cross and Blue Shield organizations, health maintenance organizations (HMOs), self-insured programs by companies and other organizations, and all other insurance arrangements, except the federal or state Medicare and Medicaid programs and their successors.

Whenever the terms "medical condition" or "medical conditions" are used in this invention, they also include patients' physical and mental conditions; whenever the terms "condition" or "conditions" are used, they include patients' medical, physical and mental conditions. Whenever the terms "benefit amount" or "benefit amounts" are used in this invention, they include the terms "benefit limit" or "benefit limits" unless the terms "benefit limit" or "benefit limits" are used separately.

FIG. 1 shows, in block diagram form, the computer-based elements which can be utilized to implement the present invention. The present invention involves computer system 1, which includes processor circuitry 2 in a digital electrical computer 4. For flexibility, it is preferable to have the processor circuitry 2 formed by means of a computer program programming programmable circuitry, i.e., programming the computer (processor). The programming can be carried out with a computer program (or programs) 6, which for flexibility should be in the form of software stored in an external memory 8, such as a diskette, hard disk, virtual disk, or the like. (The virtual disk is actually an extended internal memory 10 which may assist in speeding up computing.) A diskette approach is optional, but it does provide a useful facility for inputting or storing data structures that are a product produced by the host software, as well as for inputting a software embodiment of the present invention. Of course storing the computer program 6 in a software medium is optional because the same result can be obtained by replacing the computer program in a software medium with a hardware storage device, e.g., by burning the computer program 6 into a ROM, using conventional techniques to convert software into an ASIC or FPGA, etc., as would be understood by one having a modicum of skill in the arts of computer science and electrical engineering. (It is well known in the art of computer science that it is a trivial technical exercise to go from hardware to software or vice versa. See, for example, James R. Goodman, Todd E. Marlette, and Peter K. Trzyna, "The Alappat Standard for Determining That Programmed Computers are Patentable Subject Matter," J.P.T.O.S. October 1994, Volume 76, No. 10, pages 771–786, and James R. Goodman, Todd E. Marlette, and Peter K. Trzyna, "Toward a Fact-based Standard for Determining Whether Programmed Computers are Patentable Subject Matter," J.P.T.O.S. May 1995, Vol. 77, No. 5, pages 353–367, both of which are incorporated by reference.) In this regard, it should also be noted that "input" can include inputting data for processing by the computer program 6 or inputting in the computer program 6 code itself.

An internal memory 10 works in cooperation with the external memory 8. An input device 12 could be a keyboard or equivalent means for a user to input the data discussed below. A visual display unit 14 can be employed for a visual representation, and a printer 16 can be employed for producing hard copy output 22. Note that output electrical data can also be stored to memory 8.

For such an embodiment, the following specification should operate satisfactorily: an IBM or compatible PC (type XT or upwards) computer with a 386 or higher processor, having at least 640 kb of memory (RAM). The environment/operating system could be MS-DOS/PC-DOS (or equivalent) version 3.0 or later. A numeric (math) co-processor is also advantageous in speeding up computing times, as is an extended memory. Alternatively, a Windows implementation could be used. The input device 12 can be any ANSI standard terminal, and the visual display unit 14 can be a Trinatron color monitor.

Still other alternatives include using a network of other computers 18 or a mini-computer or a mainframe system. With such larger scale approaches, the external memory 8 could be a tape or a CD ROM for data retrieval. A VAX or Microvax system running VMS 5.0 or later is an acceptable approach.

As indicated above, an embodiment could also be carried out in hardware, though this is not recommended as it is an inflexible approach. Accordingly, a hardware implementation is described here for exemplary purposes. Of course it is well known that a computer program can be stored in hardware by many approaches, not the least of which is burning it into a ROM. More sophisticated than burning a ROM, but also entirely conventional, is to use techniques to translate the computer program 6 into an ASIC or a chip that will carry out the invention in an equivalent manner, and in fact with equivalent circuitry to that formed by programming programmable computer circuitry. It is all just digital electrical circuitry processing digital electrical signals, transforming them to output different electrical signals.

The present invention can best be implemented by utilizing a database 20 of files (or an equivalent, e.g., records, a relational database, etc.) pertaining to insurance documentation data for processing as discussed herein. In FIG. 1, respective dotted lines between database 20 and input device 12, and between computer program 6 and input device 12 illustrate that the computer program 6 and contents of database 20 can be obtained from data input at the input device 12, which converts the respective input data into respective electrical signals for handling by the digital electrical computer 4, and processor 2, including storing the respective digital electrical signals in the memories 8 and 10. Output electrical data, in the form of digital electrical signals, is generated by the processor 2 processing the input electrical data in a manner specified by the executable program 6, such that when operated, the system 1 as a whole produces a tangible presentation, such as that represented in FIG. 1 as documentation 22, including such documents as insurance and illustration documentation.

There can be five basic types of file or data stored in the external memory 8:

1. The main program file (i.e., computer program 6).
2. Local files 24 (files specific to a particular user and not available to other users). These include files describing the configuration of the user's preferred output format, private dictionary files, input and output files generated by the user, etc.
3. Data files 26 local to a user, which in a single computer system, would include the main database file.
4. User utilities 28, which assist in customizing reference files and in the creation of private dictionaries.
5. Reference files 30, which are accessible to all users (e.g., users of other computers 18) and include the standard (or "public") dictionary files, files containing the menus, error and information messages and prompts.

Of course if the invention is carried out with one computer and used by one user, reference files 30 are kept along with local files 24. In any case, a user should have access to the files that include the above-referenced insurance documentation.

The programmed processor circuitry 2 uses the contents of files 24–30 which represents some or all of the data input by the user to produce output data in a digital electrical form of a string of bits which correspond to processed data. The processor circuitry 2 carries out its operations by using at least one "filter", which can be characterized as an analysis or process restricted by a precise definition. Elements of the definition can be characterized by at least one logical operator or operand to indicate the precise definition or process to be carried out, e.g., whether the union or intersection of two elements or the complement of an element is required. The term "filter" is also applied to the process of applying this definition to change, create, or generate, or exclude data other than that defined from subsequent processing.

This invention can also be implemented by utilizing at least one pointer to insert a computed piece of data into the preformatted text of the above-referenced documentation in the appropriate data file(s). Alternatively, a plurality of pointers can be logically linked so that the output electrical data can be inserted in a plurality of locations in the aforementioned insurance documentation 22. The computer program 6 controlling the digital electrical computer 4 checks for the pointer(s) to ascertain whether any electrical output data should be inserted in generating the insurance documentation 22. This is preferable to an approach of doing the computing described in FIG. 2 and then manually entering the computed amounts on printed insurance documentation preformatted to accommodate the inserted amounts.

Figure 2:
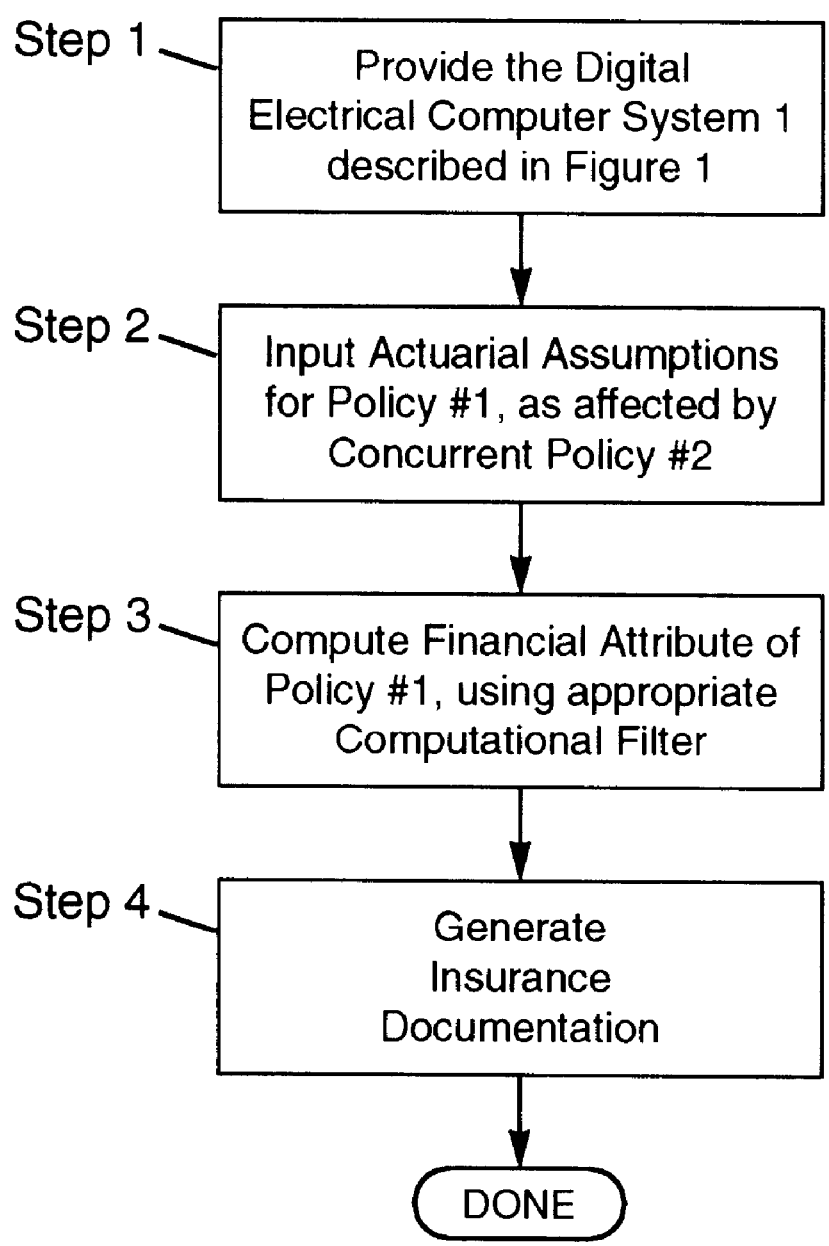
FIG. 2 is a flowchart representing a method carried out in connection with the apparatus, the method involving an embodiment of the present invention to compute a financial attribute, e.g., a premium, for a first insurance policy affected by a concurrent second insurance policy.

In FIG. 2, four steps are included in the computing, by digital electrical computer means, of a financial attribute, e.g., a premium, for a first insurance policy affected by a concurrent second insurance policy.

Step 1 includes providing, as described in FIG. 1, a digital electrical computer apparatus including a digital computer having a processor, the processor electrically connected to an input device, for receiving input data and for converting the input data into input electrical signals, and to a printer, for converting the output electrical signals into printed documentation; wherein the step of providing includes programming the processor to produce a programmed processor controlling the digital electrical computer apparatus and changing the input electrical signals into the output electrical signals in accordance with the method.

Step 2 includes receiving, as part of the input data, actuarial assumptions defining a first insurance policy for a first risk having a claims cost reflecting: a concurrent second insurance policy for a second risk, the second risk being different from the first risk; the policies being for the same insured; and the second policy affecting a claims cost of the first policy.

Step 3 includes carrying out the changing of the input electrical signals into the output electrical signals, by utilizing an appropriate computational filter, so as to include a computed financial attribute for the first insurance policy.

Step 4 includes generating printed insurance documentation, including the computed financial attribute, at said printer.

Figure 3:
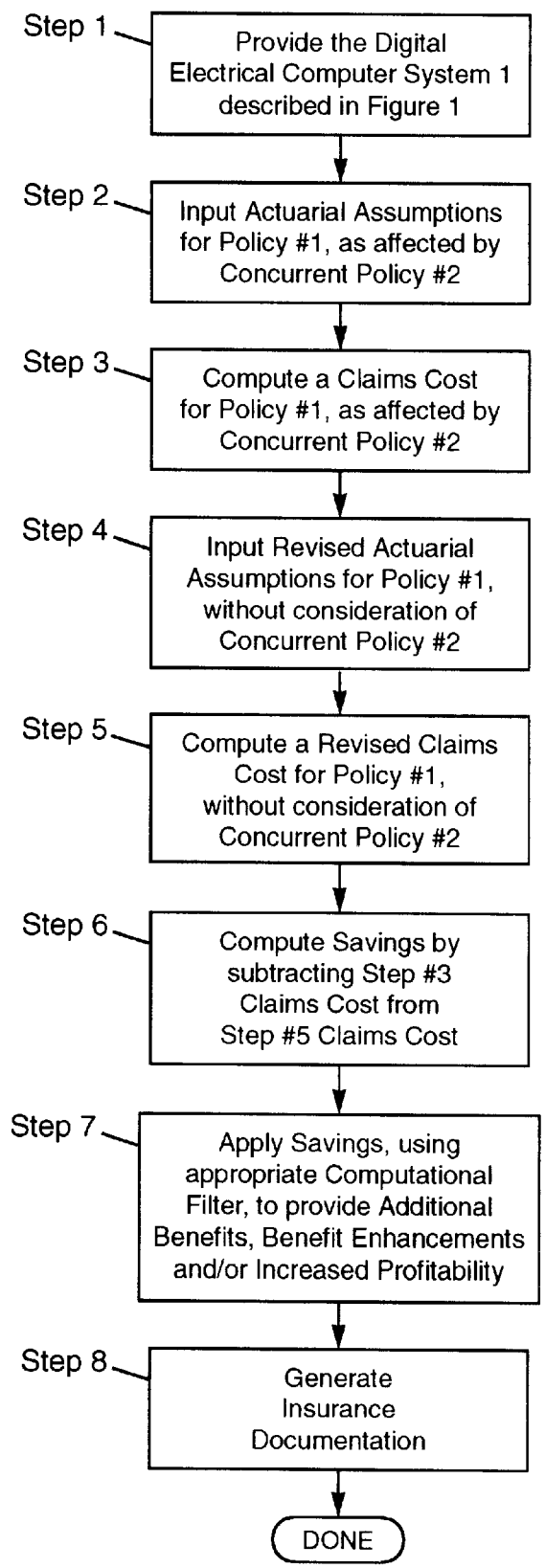
FIG. 3 is a flowchart representing a method carried out in connection with the apparatus, the method involving computing and applying a reduction (savings) in a claims cost for a first insurance policy affected by a concurrent second insurance policy, the method involving another embodiment of the present invention.

Turning now to FIG. 3, there are 8 steps involved in providing a computation of the reduction (savings) in a claims cost of a first insurance policy that is attributable to the presence of a concurrent second insurance policy.

Step 1. Provide, as described in FIG. 1, a digital electrical computer apparatus including a digital computer having a processor, the processor electrically connected to an input device, for receiving input data and for converting the input data into input electrical signals, and to a printer, for converting the output electrical signals into printed documentation; wherein the step of providing includes programming the processor to produce a programmed processor controlling the digital electrical computer apparatus and changing the input electrical signals into the output electrical signals in accordance with the method.

Step 2. Input actuarial assumptions defining a first insurance policy for a first risk having a claims cost reflecting: a concurrent second insurance policy for a second risk, the second risk being different from the first risk; the policies being for the same insured; and the second policy affecting a claims cost of the first policy.

Step 3. Carry out the changing of the input electrical signals into the output electrical signals, by utilizing an appropriate computational filter, so as to include a computed claims cost for the first insurance policy.

Step 4. Input revised actuarial assumptions defining a first insurance policy for a first risk having a claims cost that does not reflect: a concurrent second insurance policy for a second risk, the second risk being different from the first risk; the policies being for the same insured; and the second policy otherwise affecting a claims cost of the first policy.

Step 5. Carry out the changing of the input electrical signals into the output electrical signals, by utilizing an appropriate computational filter, so as to include a computed revised claims cost for the first insurance policy.

Step 6. Compute the reduction (savings) in the claims cost of the first insurance policy by subtracting the claims cost determined in Step 3 above from the revised claims cost determined in Step 5 above.

Step 7. Apply the savings determined in Step 6 above, by utilizing an other appropriate computational filter, to provide additional benefits and/or benefit enhancements for a person insured under, and/or to increase the profitability for the insurer of, the first insurance policy.

Step 8. Generate printed insurance documentation, including the computed additional benefits, benefit enhancements and/or profitability increase, at said printer.

Once again, it is important to note that steps 2 through 5 can be rearranged without affecting the results of this embodiment of the invention provided that: the claims cost described in Step 3 is always based on the actuarial assumptions described in Step 2; the revised claims cost described in Step 5 is always based on the revised actuarial assumptions described in Step 4; and the claims cost is always subtracted from the revised claims cost.

FIGS. 4 and 5 are illustrations of the type of insurance documentation that can be produced through the application of this invention as illustrated in the FIG. 3 flowchart to a first insurance policy providing benefits for nursing home patients under an arrangement based on the aforementioned related patent application in conjunction with a second insurance policy providing benefits for home health care patients under an arrangement based on Wilson's aforementioned system. FIG. 4 illustrates step 6 above wherein the reduction (savings) in the first insurance policy's claims cost is computed. FIG. 5 illustrates step 7 above wherein the savings computed in FIG. 4 have been applied, by computer means, to provide a benefit enhancement in the form of reducing the policy's elimination period (the initial period of nursing home confinement for which no benefits are payable) from 100 days to 0 days.

More particularly, an approach to implementing an embodiment of the present invention, utilizing the steps shown in FIG. 3, is to illustrate, as shown in FIG. 4, how the claims cost of a first insurance policy that provides benefits for care in nursing homes and other group living facilities under an arrangement based on the aforementioned related patent application can be reduced by the presence of a concurrent second insurance policy that provides benefits for home health care under an arrangement based on Wilson's aforementioned system, with the resultant reduction (savings) then being applied, as shown in FIG. 5, to the provision of additional benefits, benefit enhancements and/or increased profitability.

Step 1. Provide the Computer System 1 described in FIG. 1.

Provide, as described in FIG. 1, a digital electrical computer apparatus including a digital computer having a processor, the processor electrically connected to an input device, for receiving input data and for converting the input data into input electrical signals, and to a printer, for converting the output electrical signals into printed documentation; wherein the step of providing includes programming the processor to produce a programmed processor controlling the digital electrical computer apparatus and changing the input electrical signals into the output electrical signals in accordance with the method.

Step 2. Input "Revised" Actuarial Assumptions.

(To facilitate the construction of FIG. 4, the inventors herein have rearranged the steps shown in FIG. 3, in accordance with the notation four paragraphs above. Thus, this step is shown as Step 4 in FIG. 3; Step 3 below is shown as Step 5 in FIG. 3; Step 4 below is shown as Step 2 in FIG. 3; and Step 5 below is shown as Step 3 in FIG. 3.)

Input the "revised" actuarial assumptions defining a first insurance policy for a first risk having a claims cost that does not reflect: a concurrent second insurance policy for a second risk, the second risk being different from the first risk; the policies being for the same insured; and the second policy otherwise affecting a claims cost of the first policy. As shown in the first section of FIG. 4, columns A through H, the following "revised" actuarial assumptions were inputted for the first insurance policy providing benefits for care in nursing homes and other group living facilities under an arrangement based on the aforementioned related patent application:

Column A. Patient Category. (This column also applies, without change, to the actuarial assumptions to be inputted in Step 4 below.)

Column B. ADL Range (This column also applies, without change, to the actuarial assumptions to be inputted in Step 4 below. In the ensuing description, the term "Patient Category" includes ADL Range unless otherwise indicated.)

Column C. Distribution of Nursing Home Patients by Patient Category. (This column is also the basis for computations to be made in Step 4 below.)

Column D. Daily Nursing Home Benefit by Patient Category. (This column also applies, without change, to the actuarial assumptions to be inputted in Step 4 below.)

Column E. Duration, in Months, of Average Nursing Home Confinement by Patient Category. (This column is also the basis for computations to be made in Step 4 below.)

Column F. Months of Paid Nursing Home Benefits by Patient Category. The inventors herein determined that the inputted "revised" actuarial assumptions should include an imbedded computational filter to calculate the number of months for which an insurer will pay benefits after application of the first policy's elimination period. This is accomplished by first dividing the number of days in Elimination Period #1, as indicated above these 8 columns, by the quotient resulting from dividing the average number of days in a year (365.25) by 12. The resultant second mathematical quotient is then subtracted from the value in column E for each Patient Category to determine the value to be entered in this column. If a remainder resulting from application of this computational filter is a negative number, zero is entered as the value in this column for that Patient Category.

Column G. Weighted Monthly Benefit by Patient Category. For the purpose of this FIG. 4, because the distribution of nursing home patients varies widely by Patient Category, the inventors herein determined that the inputted "revised" actuarial assumptions should include a second imbedded computational filter to calculate a Weighted Monthly Benefit for each Patient Category. Said computational filter multiplies the value in column C for each Patient Category by the value in column D for that Patient Category to produce a mathematical product, then multiplies that product by the average number of days in a year (365.25) divided by 12. The resultant value represents an insurer's maximum monthly benefit exposure prior to the application of the policy's elimination period (the initial period of nursing home confinement for which no benefits are payable) and the number of months for which benefits will be paid.

Column H. Weighted Present Value of All Nursing Home Benefit Payments ("Revised" Claims Cost) by Patient Category. The inventors herein have included a third computational filter as part of the inputted "revised" actuarial assumptions, the purpose of which is to calculate a present value of all benefits to be paid, after application of the policy's elimination period, in each Patient Category. This is accomplished by multiplying the value in column G for a Patient Category by the value in column F for that category, then multiplying that mathematical product by an appropriate computational filter to calculate the present value of a future benefit. Such present value computational filters are well known and understood by anyone having a modicum of skill in the arts of actuarial science. For the purpose of this present value calculation, the inventors used an Assumed Annual Interest Rate of 6.00%, as indicated above these 8 columns of "revised" actuarial assumptions, and assumed that benefits are paid once a month at the end of the month to which they apply.

Step 3. Compute a Revised Claims Cost.

This is accomplished by adding together all of the values computed in column H, "Weighted Present Value of Total Nursing Home Benefit Payments ("Revised" Claims Cost) for each Patient Category." The resultant sum ($22,581.21) appears at the bottom of column H.

Step 4. Input Actuarial Assumptions.

Input the actuarial assumptions defining a first insurance policy for a first risk having a claims cost that does reflect: a concurrent second insurance policy for a second risk, the second risk being different from the first risk; the policies being for the same insured; and the second policy affecting a claims cost of the first policy. As shown in the second section of FIG. 4, columns J through T, the following actuarial assumptions were inputted for the first insurance policy. (Notes: Columns J through P apply to patients who, it is assumed, will receive benefits not only from the first insurance policy, but also from a concurrent second insurance policy having a benefit arrangement based on Wilson's aforementioned system. Columns Q through S apply to patients who, it is assumed, will receive benefits only from the first insurance policy. Column T sums values derived from columns J through P and columns Q through S.)

Column J. Patient Qualifies for Medicare's Nursing Home Benefits?For the purpose of FIG. 4, the inventors herein assumed that patients in the first four broad Patient Categories, "Extensive Services," Rehabilitation, "Special Care," and "Clinically Complex," will qualify for Medicare's Nursing Home (Skilled Nursing Facility) Benefits, whereas patients in the last two Patient Categories, "Cognitive & Behavior" and "Reduced Physical Functions," will not qualify for said benefits.

Column K. Percent of Patients with both policies who receive Care at Home. This is the percentage of the patients indicated in column C who the inventors herein have assumed will receive insurance benefits for care at home because they are also insured under the concurrent second insurance policy.

Column L. Patient Distribution eligible for both Nursing Home and Home Care Insurance Benefits. The values in this column, to be used in ensuing computations, are the mathematical product resulting from multiplying, for each Patient Category, the value in column K by the value in column C.

Column M. Months of Care at Home and for which Benefits are Available under the concurrent second insurance policy. For patients who are eligible for Medicare's Skilled Nursing Facility Benefits, and are recovering from the most severe medical conditions after a period of hospitalization, the inventors herein have assumed that they will be sent to a Medicare Skilled Nursing Facility for their initial stage of recovery, and then sent home to complete their recovery earlier than would otherwise be the case because of the presence of the concurrent second insurance policy.

For the following Patient-ADL Categories, for patients insured by both policies, the inventors herein have assumed the indicated periods of initial confinement in a Medicare Skilled Nursing Facility:

| Patient Category | ADL Range | Duration, in Months |
|---|---|---|
| Extensive Services | | |
| 3+ Types | 7–18 | 1.5 |
| 2 Types | 7–18 | 1.0 |
| Special Care | 17–18 | 1.0 |
| | 14–16 | 0.5 |
| Clinically Complex | 17–18 | 1.5 |

For all other patients in the first four broad Patient Categories, "Extensive Services," Rehabilitation, "Special Care," and "Clinically Complex," it was assumed that they will not be sent to a Medicare Skilled Nursing Facility to recover because of the availability of sufficient benefits under the concurrent second insurance policy to pay for the cost of their recovery at home.

Patients in the last two Patient Categories, "Cognitive & Behavior" and "Reduced Physical Functions," will not qualify for Medicare's Skilled Nursing Facility Benefits. Thus, the inventors herein have assumed that they will be able to delay admission into a nursing home for the indicated number of months because of the availability of benefits under the concurrent second insurance policy.

Column N. Months of Paid Nursing Home Benefits. The inventors herein have assumed that the first insurance policy's benefits are fully coordinated with Medicare. That is, they do not pay for any care in a Skilled Nursing Facility that is covered by Medicare, or that would have been covered by Medicare except for Medicare's coinsurance and deductible requirements. Thus, for those few patients in the aforementioned first four broad Patient Categories who are sent to Medicare's Skilled Nursing Facilities for their initial stages of recovery, no benefits are payable under the first insurance policy because: (1) Medicare covers the first 100 days of Skilled Nursing Facility care; and (2) their periods of confinement, as indicated above in the description of column M, will be shorter than 100 days (3.29 months).

Patients in the aforementioned last two Patient Categories, despite the fact that the concurrent second insurance policy will pay benefits for care at home, will not be eligible to receive benefits under the first insurance policy for any days of care in a nursing home during the first policy's elimination period. Thus, the inventors determined that the inputted actuarial assumptions should include a fourth imbedded computational filter to calculate the number of months of care in a nursing home for which an insurer will pay benefits after: (1) the indicated period of care in a patient's home has been provided, and (2) application of the first policy's elimination period. This is accomplished by first subtracting the months of care at home (column M) from the total months of care required (column E), thereby producing a first mathematical remainder. Then, the number of days in Elimination Period #2, as indicated above these columns, is divided by the quotient resulting from dividing the average number of days in a year (365.25) by 12. The resultant second mathematical quotient is then subtracted from the first mathematical remainder for each Patient Category to determine the value (the second mathematical remainder) to be entered in this column. If the second remainder resulting from application of this computational filter is a negative number, zero is entered as the value in this column for that Patient Category.

Column O. Weighted Monthly Nursing Home Benefit by Patient Category. The inventors herein determined that the inputted actuarial assumptions should include a fifth imbedded computational filter to calculate a Weighted Monthly Nursing Home Benefit for each Patient Category. Said computational filter multiplies the value in column L for each Patient Category by the value in column D for that Patient Category to produce a mathematical product, then multiplies that product by the average number of days in a year (365.25) divided by 12. The resultant value represents an insurer's maximum monthly benefit exposure prior to the application of the first insurance policy's elimination period and the number of months for which benefits will be paid.

Column P. Weighted Present Value of All Nursing Home Benefit Payments (Claims Cost) by Patient Category. The inventors herein have included a sixth computational filter as part of the inputted actuarial assumptions, the purpose of which is to calculate a present value of all benefits to be paid, after application of the policy's elimination period, in each Patient Category. This is accomplished by multiplying the value in column O for a Patient Category by the value in column N for that category, then multiplying that mathematical product by an appropriate computational filter to calculate the present value of a future benefit. Once again, such present value computational filters are well known and understood by anyone having a modicum of skill in the arts of actuarial science. For the purpose of this present value calculation, the inventors used the same Assumed Annual Interest Rate of 6.00% used for column H and likewise assumed that benefits are paid once a month at the end of the month to which they apply.

Column Q. Patient Distribution eligible for only Nursing Home Insurance Benefits. This is the percentage of the patients indicated in column C who the inventors herein have assumed will receive benefits only under the first insurance policy for care in a nursing home even though they are also insured under the concurrent second insurance policy. The values in this column, to be used in ensuing computations, are the mathematical remainder resulting from subtracting, for each Patient Category, the value in column L from the value in column C.

Column R. Weighted Monthly Nursing Home Benefit by Patient Category. The inventors herein determined that the inputted actuarial assumptions should include a seventh imbedded computational filter to calculate a Weighted Monthly Nursing Home Benefit for each Patient Category. Said computational filter multiplies the value in column Q for each Patient Category by the value in column D for that Patient Category to produce a mathematical product, then multiplies that product by the average number of days in a year (365.25) divided by 12. The resultant value represents an insurer's maximum monthly benefit exposure prior to the application of the first insurance policy's elimination period and the number of months for which benefits will be paid.

Column S. Weighted Present Value of All Nursing Home Benefit Payments (Claims Cost) by Patient Category. The inventors herein have included an eighth computational filter as part of the inputted actuarial assumptions, the purpose of which is to calculate a present value of all benefits to be paid, after application of the policy's elimination period, in each Patient Category. This is accomplished by multiplying the value in column R for a Patient Category by the value in column Q for that category, then multiplying that mathematical product by an appropriate computational filter to calculate the present value of a future benefit. Once again, the inventors used the same Assumed Annual Interest Rate of 6.00% used for column H and likewise assumed that benefits are paid once a month at the end of the month to which they apply.

Column T. Total Weighted Present Value of All Nursing Home Benefit Payments (Claims Cost) by Patient Category. For insureds having both the first insurance policy and the concurrent second insurance policy, this is the sum of: (1) an insurer's Weighted Present Value of All Nursing Home Benefits for patients who are eligible to receive both Nursing Home and Home Recovery Care benefits (column P), and (2) the insurer's Weighted Present Value of All Nursing Home Benefits for patients who receive benefits only under the first insurance policy (column S).

Step 5. Compute a Claims Cost.

This is accomplished by adding together all of the values computed in column T, "Total Weighted Present Value of Total Nursing Home Benefit Payments (Claims Cost) for each Patient Category." The resultant sum ($18,755.29) appears near the bottom of column T.

Step 6. Compute Savings in Claims Cost.

This is accomplished by subtracting the Claims Cost determined in Step 5 above from the Revised Claims Cost determined in Step 3 above. The result ($3,825.92) appears at the bottom of column T.

Turn now to FIG. 5 to continue the steps shown in FIG. 3.

Step 7. Apply Savings.

The inventors herein constructed the computational spreadsheet shown as FIG. 4 so as to include a number of computational filters not previously described so as to allow adjustment of certain financial attributes of the first policy to calculate the effects thereon by the application of the Savings in Claims Cost determined in Step 6 above. The selected adjustable financial attributes appear in the first 3 rows under columns A through H, and the first 2 rows under columns K through S. They include:

1. Maximum Daily (Nursing Home) Benefit;
2. Home Recovery Care Policy Maximum Benefit; and
3. Elimination Period #2.

FIG. 5 represents an illustration of how the value of one of these selected financial attributes (Elimination Period #2) can be calculated. By applying $2,636.31 of the $3,825.92 Savings in Claims Cost calculated in FIG. 4, it was found that Elimination Period #2 can be reduced from the 100 days shown in FIG. 4 to 0 days, as shown near the top of columns K through O of FIG. 5, with $1,189.61 of remaining Savings to be applied to the provision of other additional benefits and/or benefit enhancements for consumers, and/or as increased profitability for an insurer, without changing the premium charged to the consumer.

Step 8. Generate Insurance Documentation.

FIGS. 4 and 5 are representative examples of insurance documentation that can be generated by this invention. Other examples of such insurance documentation include insurance policies and the schedules therefor, rate tables, and benefit descriptions.

Thus, it can be seen that this invention is a valuable tool that allows an insurer to precisely calculate the value of a financial attribute of a first insurance policy attributable to the presence of a concurrent second insurance policy with insured contingencies, risks and/or perils that are different from those of the first policy. Thus, the insurer can, for the first insurance policy: reduce its premiums, add additional benefits and/or benefit enhancements, and/or increase its profits, without increasing the insurer's financial risk. As a result, this invention can give an insurer a significant advantage over its competitors.

While the above description contains many specificities, these should not be construed as limitations on the scope of the invention, but rather as an exemplification of one preferred embodiment thereof. Many other variations are possible such as, but not limited to, those described in the Objects and Advantages section above. Thus, the scope of the invention should be determined by the appended claims and their legal equivalents, rather than by the principal embodiment and other examples described above.

We claim:

1. A method for using an apparatus to process digital electrical signals to generate documentation using a computed value for claims cost affected by at least one concurrent, different insurance policy, the method including the steps of:

providing an apparatus including a digital electrical computer having a processor, the processor electrically connected to an input device, for receiving input data and for converting the input data into input electrical signals, and to a printer, for converting output electrical signals into printed documentation, the processor being programmed to control the apparatus in changing the input electrical signals to produce the output electrical signals in accordance with said method;

receiving, as part of the input data, actuarial assumptions defining a first insurance policy for a first risk having a claims cost affected by at least a second concurrent insurance policy for a respectively different risk for an insured person; wherein the changing of the input electrical signals into the output electrical signals includes computing a first value for the claims cost for the first insurance policy and computing a second value representing an extent to which the claims cost for the first insurance policy is influenced by the second insurance policy; and using the first value to generate printed insurance documentation at said printer.

2. The method of claim 1, wherein the extent represents a savings in claims cost for the first insurance policy, and wherein the changing of the input electrical signals into the output electrical signals includes applying the savings in claims cost, at least partially, as an offset to a premium for the first insurance policy when it is concurrently in force along with the second insurance policy; and wherein the step of generating printed insurance documentation includes generating a representation of the reduced premium cost.

3. The method of claim 1, wherein the extent represents a savings in claims cost for the first insurance policy, and wherein the changing of the input electrical signals into the output electrical signals includes applying the savings in claims cost, at least partially, as an offset to a cost for providing at least one additional benefit to the first insurance policy when it is concurrently in force along with the second insurance policy; and wherein the step of generating printed insurance documentation includes generating a representation of the at least one additional benefit.

4. The method of claim 1, wherein the extent represents a savings in claims cost for the first insurance policy, and wherein the changing of the input electrical signals into the output electrical signals includes applying the savings in claims cost, at least partially, as an offset to a cost for providing at least one benefit enhancement to the first insurance policy when it is concurrently in force along with the second insurance policy; and wherein the step of generating printed insurance documentation includes generating a representation of the at least one enhanced benefit.

5. The method of claim 1, wherein the extent represents a savings in claims cost for the first insurance policy, and wherein the changing of the input electrical signals into the output electrical signals includes applying the savings in claims cost, at least partially, to a value reflecting profit for the insurer of the first insurance policy.

6. The method of claim 1, wherein the actuarial assumptions reflect that the first insurance policy is for life insurance and the second insurance policy is for health insurance.

7. The method of claim 1, wherein the actuarial assumptions reflect that the first insurance policy is for life insurance and the second insurance policy is for medical insurance.

8. The method of claim 1, wherein the actuarial assumptions reflect that the first insurance policy is for medical insurance and the second insurance policy is for home health care insurance.

9. The method of claim 1, wherein the actuarial assumptions reflect that the first insurance policy provides hospitalization insurance benefits, and the second insurance policy is for home health care insurance.

10. The method of claim 1, wherein the actuarial assumptions reflect that the first insurance policy provides benefits for patients in a group living arrangement, said benefits not being based on defined patient-care categories, and the second insurance policy is for home health care insurance.

11. The method of claim 1, wherein the actuarial assumptions reflect that the first insurance policy provides benefits for patients in a group living arrangement, said benefits not being based on defined patient-care categories, and the second insurance policy having maximum aggregate benefit limits for home health care, the benefit limits varying according to relative severity of patient medical conditions.

12. The method of claim 1, wherein the actuarial assumptions reflect that the first insurance policy provides duration-specific benefits for patients in a group living arrangement, the benefits varying according to defined patient-care categories, and the second insurance policy having maximum aggregate benefit limits for home health care, the benefit limits varying according to relative severity of patient medical conditions.

13. The method of claim 1, wherein the at least one other concurrent insurance policy for a respectively different risk for an insured person includes a third insurance policy; and wherein the changing of the input electrical signals into the output electrical signals includes computing a third value representing an extent to which the claims cost for one of the first insurance policy and the second insurance policy is influenced by the third policy.

14. The method of claim 13, further including the step of:

applying at least a portion of the third value to a value representing a member of a group consisting of reduced premium, an additional benefit, a benefit enhancement, an increase in profit, and a combination thereof.

15. Apparatus for processing digital electrical signals to generate documentation using a computed value for claims cost affected by at least one concurrent, different insurance policy, the apparatus including:

a digital electrical computer having a processor, the processor electrically connected to an input device, for receiving input data and for converting the input data into input electrical signals, and to a printer, for converting output electrical signals into printed documentation, the processor being programmed to control the apparatus in changing the input electrical signals into the output electrical signals including:

receiving, as part of the input data, actuarial assumptions defining a first insurance policy for a first risk having a claims cost affected by at least a second concurrent insurance policy for a respectively different risk for an insured person; wherein the changing of the input electrical signals into the output electrical signals includes computing a first value for the claims cost for the first insurance policy and computing a second value representing an extent to which the claims cost for the first insurance policy is influenced by the second insurance policy; and using the first value to generate printed insurance documentation at said printer.

16. A method for making an apparatus, the method including the steps of:

providing a digital electrical computer having a processor, the processor electrically connected to an input device, for receiving input data and for converting the input data into input electrical signals, and to a printer, for converting the output electrical signals into printed documentation;

providing a program controlling the processor in controlling the apparatus in changing the input electrical signals into the output electrical signals, including:

receiving, as part of the input data, actuarial assumptions defining a first insurance policy for a first risk having a claims cost affected by at least a second concurrent insurance policy for a respectively different risk for an insured person; wherein the changing of the input electrical signals into the output electrical signals includes computing a first value for the claims cost for the first insurance policy and computing a second value representing an extent to which the claims cost for the first insurance policy is influenced by the second insurance policy; and using the first value to generate printed insurance documentation at said printer.

17. A method for using an apparatus to process digital electrical signals to generate output data using a computed value for claims cost affected by at least one concurrent, different insurance policy, the method including the steps of:

providing an apparatus including a digital electrical computer having a processor, the processor electrically connected to an input device, for receiving input data and for converting the input data into input electrical signals, and to an output device, the processor being programmed to control the apparatus in changing the input electrical signals to produce output data at the output device in accordance with said method;

receiving, as part of the input data, actuarial assumptions defining a first insurance policy for a first risk having a claims cost affected by at least a second concurrent insurance policy for a respectively different risk for an insured person; wherein the changing of the input electrical signals to produce the output data includes computing a first value for the claims cost for the first insurance policy and computing a second value representing an extent to which the claims cost for the first insurance policy is influenced by the second insurance policy; and using the first value to generate the output data at the output device.

\* \* \* \* \*